(12) United States Patent
Grabbe (10) Patent No.: US 10,195,549 B1
(45) Date of Patent: Feb. 5, 2019

(54) BACKWASH SHOE METHOD AND APPARATUS THAT INCREASES EFFECTIVE SURFACE AREA OF CLOTH FILTER MEDIA

(71) Applicant: Ulrich Grabbe, Buttikon (CH)

(72) Inventor: Ulrich Grabbe, Buttikon (CH)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 0 days.

(21) Appl. No.: 15/819,061

(22) Filed: Nov. 21, 2017

(51) Int. Cl.
  *B01D 29/68* (2006.01)
  *B01D 29/70* (2006.01)
  *B01D 39/08* (2006.01)

(52) U.S. Cl.
  CPC .......... *B01D 29/68* (2013.01); *B01D 29/705* (2013.01); *B01D 39/08* (2013.01); *B01D 2239/0654* (2013.01)

(58) Field of Classification Search
  None
  See application file for complete search history.

(56) References Cited

U.S. PATENT DOCUMENTS

| | | | | |
|---|---|---|---|---|
| 605,234 A | * | 6/1898 | Sherk | F21V 17/00 362/379 |
| 1,432,134 A | * | 10/1922 | Sweetland | B01D 33/801 210/203 |
| 1,649,220 A | * | 11/1927 | Goodloe | B01D 46/26 110/165 A |
| 1,833,315 A | * | 11/1931 | Burhans | B01D 35/10 139/391 |
| 1,985,854 A | * | 12/1934 | Downes | B01F 3/04765 210/219 |
| 2,076,980 A | * | 4/1937 | Cooper | B01D 39/083 210/502.1 |
| 2,781,133 A | * | 2/1957 | Thompson | 210/347 |
| 3,019,186 A | * | 1/1962 | Powers | B01D 35/10 210/499 |
| 3,238,124 A | * | 3/1966 | Burton | C02F 3/06 210/150 |
| 3,527,351 A | * | 9/1970 | Wade | B01D 29/216 210/356 |
| 3,815,341 A | * | 6/1974 | Hamano | B01D 39/083 55/477 |
| 3,917,150 A | * | 11/1975 | Ferguson | F01D 11/001 228/159 |

(Continued)

FOREIGN PATENT DOCUMENTS

DE   19828171 A1 * 12/1999 ............. B01D 29/09

OTHER PUBLICATIONS

Aqua-Aerobic Systems, Inc., Cloth Media Filtration brochure, 2016, p. 4.

Primary Examiner — Robert J Popovics
(74) Attorney, Agent, or Firm — Vitale, Vickrey, Niro & Gasey LLP (57) ABSTRACT

Backwash shoes and methods of using backwash shoes are provided to increase the filtration area of a cloth filter media, the backwash shoe having a trailing surface formed from a series of merlons and crenels whereby some of the pile threads of the cloth filter media are compressed toward the support surface of the cloth filter media by the trailing surface and some of the pile threads remain in an extended or straightened position.

11 Claims, 11 Drawing Sheets

(56) References Cited

U.S. PATENT DOCUMENTS

| | | | | |
|---|---|---|---|---|
| 3,977,847 A * | 8/1976 | Clark | B01D 46/0067 | 95/279 |
| 4,090,965 A * | 5/1978 | Fuchs | B01D 33/067 | 210/151 |
| 4,167,482 A * | 9/1979 | Muller | B01D 35/10 | 210/411 |
| 4,219,420 A * | 8/1980 | Muller | B01D 35/10 | 210/411 |
| 4,294,694 A * | 10/1981 | Coulthard | C02F 3/103 | 210/150 |
| 4,416,782 A * | 11/1983 | Kerres | B01D 17/045 | 210/483 |
| 4,451,362 A * | 5/1984 | Spelsberg | C02F 3/10 | 210/150 |
| 4,639,315 A | 1/1987 | Fuchs | | |
| 4,671,976 A * | 6/1987 | Vidal | A47K 1/14 | 4/286 |
| 4,725,292 A * | 2/1988 | Williams | B01D 33/073 | 55/290 |
| 4,783,259 A * | 11/1988 | Wade | B01D 35/10 | 210/167.12 |
| 4,851,136 A * | 7/1989 | Fanqing | B01D 35/10 | 210/798 |
| 5,007,766 A * | 4/1991 | Freed | E02B 3/043 | 405/24 |
| 5,085,766 A * | 2/1992 | Born | B01D 39/00 | 210/150 |
| 5,128,029 A * | 7/1992 | Herrmann | B01D 29/05 | 210/107 |
| 5,190,571 A * | 3/1993 | Fay | B01D 39/2082 | 55/523 |
| 5,362,401 A * | 11/1994 | Whetsel | B01D 33/21 | 134/34 |
| 5,374,360 A * | 12/1994 | Weis | B01D 33/21 | 210/107 |
| 5,409,618 A * | 4/1995 | Price | B01D 33/0315 | 210/784 |
| 5,690,823 A * | 11/1997 | Reipur | B01D 35/10 | 210/321.79 |
| 5,855,799 A * | 1/1999 | Herrmann | B01D 17/045 | 210/780 |
| 6,103,132 A | 8/2000 | Seyfried | | |
| 6,294,098 B1 | 9/2001 | Bergmann | | |
| 6,508,942 B2 * | 1/2003 | Morimura | B01D 35/10 | 210/483 |
| 6,776,295 B2 * | 8/2004 | Morimura | B01D 35/10 | 210/489 |
| 6,808,076 B2 * | 10/2004 | Villares Lenz Cesar | B01D 33/067 | 210/391 |
| 7,208,082 B2 * | 4/2007 | Hurst | B01D 21/0006 | 210/164 |
| 7,438,802 B2 * | 10/2008 | Hurst | B01D 21/0006 | 210/163 |
| 7,537,689 B2 * | 5/2009 | Ricketts | B01D 29/05 | 210/107 |
| 7,678,284 B2 | 3/2010 | Ricketts | | |
| 7,927,394 B2 * | 4/2011 | MacKenzie | B01D 46/0031 | 55/392 |
| 8,048,296 B2 | 11/2011 | Stevens | | |
| 8,640,883 B2 * | 2/2014 | Doig | B01D 29/114 | 210/483 |
| 8,778,174 B2 * | 7/2014 | Xia | B01D 29/39 | 210/108 |
| 8,852,445 B2 | 10/2014 | Xia | | |
| 8,926,843 B2 * | 1/2015 | Baker | B01D 33/11 | 210/107 |
| 9,221,000 B2 * | 12/2015 | Doig | B01D 29/114 | |
| 9,352,255 B2 | 5/2016 | Kuk | | |
| 9,968,872 B2 * | 5/2018 | Carayon | B01D 33/073 | |
| 2003/0080072 A1 | 5/2003 | Morimura | B01D 35/10 | 210/767 |
| 2003/0146171 A1 * | 8/2003 | Herrmann | B01D 29/055 | 210/741 |
| 2004/0112825 A1 * | 6/2004 | Villares Lenz Cesar | B01D 33/067 | 210/391 |
| 2005/0000870 A1 * | 1/2005 | Ricketts | B01D 29/05 | 210/107 |
| 2005/0139557 A1 * | 6/2005 | Ricketts | B01D 29/05 | 210/791 |
| 2006/0091049 A1 * | 5/2006 | Hurst | B01D 21/0006 | 210/163 |
| 2006/0124520 A1 * | 6/2006 | Hurst | B01D 21/0006 | 210/163 |
| 2007/0045162 A1 * | 3/2007 | Hurst | B01D 21/0006 | 210/163 |
| 2008/0105603 A1 * | 5/2008 | Hurst | E03F 1/00 | 210/163 |
| 2009/0026152 A1 * | 1/2009 | Collins | B01D 33/21 | 210/791 |
| 2009/0178976 A1 * | 7/2009 | Stevens | B01D 29/39 | 210/741 |
| 2011/0011790 A1 * | 1/2011 | Doig | B01D 29/114 | 210/393 |
| 2012/0091065 A1 * | 4/2012 | Xia | B01D 29/39 | 210/702 |
| 2012/0325753 A1 * | 12/2012 | Baker | B01D 33/11 | 210/744 |
| 2013/0032515 A1 * | 2/2013 | Carayon | B01D 33/073 | 210/158 |
| 2013/0048553 A1 * | 2/2013 | Kuk | B01D 33/21 | 210/411 |
| 2013/0105415 A1 * | 5/2013 | Xia | B01D 29/39 | 210/791 |
| 2014/0048474 A1 * | 2/2014 | Kuk | B01D 33/21 | 210/393 |
| 2014/0102992 A1 * | 4/2014 | Doig | B01D 29/114 | 210/791 |
| 2014/0116965 A1 * | 5/2014 | Cote | B01D 33/11 | 210/784 |
| 2016/0059156 A1 * | 3/2016 | Dannemann | B01D 29/684 | 210/791 |
| 2016/0144303 A1 * | 5/2016 | Tanida | B01D 33/073 | 210/650 |
| 2018/0056214 A1 * | 3/2018 | Cote | B01D 33/503 | |
| 2018/0071663 A1 * | 3/2018 | Carayon | B01D 33/073 | |
| 2018/0078883 A9 * | 3/2018 | Dannemann | B01D 29/684 | |

* cited by examiner

BACKWASH SHOE METHOD AND APPARATUS THAT INCREASES EFFECTIVE SURFACE AREA OF CLOTH FILTER MEDIA

FIELD OF THE INVENTION

The present inventions relate generally to the cleaning of cloth filter media used in filtration devices for water, wastewater and industrial process water streams. More particularly, the present inventions relate to backwash shoes and methods of using backwash shoes to increase the filtration surface area of the cloth filter media and thereby increase the efficiency of filtration.

BACKGROUND OF THE INVENTION

Cloth media filtration devices are well known in the industry. Such devices employ cloth filter media stretched over large drums, plates, plenums or multiple disk-type frames. An example of a preferred disk-type filtration device is known as the AquaDisk® cloth media filter, a product of Aqua-Aerobic Systems, Inc., the assignee of the present invention. Other examples may be found in U.S. Pat. Nos. 4,090,965 and 4,639,315.

The "cloth filter media" typically used in such devices include textile cloth membranes of a cellulose base material, other natural or synthetic fibers woven, knitted or wrapped into a tight, single layer or multiple layer fabric or matting to obtain the desired thickness or porosity. Such fibers may be needle felted to a textile support fabric for strength. The fibers may also be woven into a dense cut pile fabric supported by an open weave textile support grid. For ease of reference, the present inventions will be described and claimed in relation to a cloth filter media having a support fabric and a pile made of pile threads attached to said support fabric. It will be understood that the inventions are not so limited.

The cloth filter media is placed in the flow path of the fluid stream containing the solid particles which are to be removed by the filtering process of the cloth media filtration device. The particles larger than the openings of the cloth filter media are retained on the upstream, or influent side, of the cloth filter media while the remaining flow or effluent passes through the cloth filter media. The effective surface area of the cloth filter media dictates the capacity of the filtration operation, i.e., that amount of cloth that is capable of conducting the filtration operation. Over time, the solids build up on the influent side of the cloth filter media and impede the rate of filtration. This creates a hydraulic resistance which necessitates the cleaning of the influent side of the cloth filter media, which is commonly done by backwashing using suction.

Periodic backwashing is conducted using a backwash assembly. The typical backwash assembly includes a backwash shoe which is located adjacent to the influent side of the cloth filter media and which is sealed to and in fluid communication with a suction chamber. Backwash shoes typically include one or more face plates and a suction slot. The suction chamber is connected to a suction pump by a hose or pipe which actuates the reverse flow of liquid through the suction slot of the backwash shoe from the effluent side of the cloth filter media to the influent side of the cloth filter media.

During the backwashing operation, the cloth filter media may move relative to the backwash assembly or the backwash assembly may move relative to the cloth filter media, depending upon which type of cloth media filtration device is used. Due to the suction and the relative motion between the cloth filter media and the backwash shoe, the suction pressure draws the effluent across some or all of the piles of the cloth filter media into the suction slot to dislodge the accumulated solids from the influent side of the cloth filter media. The combination of reverse filtration flow and the flexing of the piles into and across the suction slot work to dislodge the accumulated solids from the cloth filter media.

There are a variety of known backwash shoes as part of backwash assemblies that are used to backwash cloth filter media. Examples of backwash shoes and methods of using them may be found in U.S. Pat. No. 6,103,132. In that example, the leading edge of the backwash shoe (i.e., the portion of the backwash shoe that is in the direction of motion of the backwash assembly or the portion of the backwash shoe that is in the direction of the moving cloth) compresses the pile threads to the support fabric just prior to the suction slot. Upon reaching the suction slot, the pile threads are abruptly released into the suction slot and cleaned. Thereafter, the trailing edge of the backwash shoe compresses the pile fibers toward the support fabric. Filtration may then be resumed as the relative motion between the cloth and the trailing edge of the backwash shoe exposes the influent side of the cloth media to the fluid stream.

Other types and configurations of backwash shoes are also known, including those that do not contact the cloth (or at least the support surface of the fabric) and those with a series of perforations and other variations. See, for example, U.S. Pat. Nos. 7,678,284; 8,048,296; 9,352,255; 8,852,445; and 6,294,098. In these types of backwash shoes, the pile threads of the cloth filter media may not be compressed by the backwash shoe against the support fabric. Instead, the piles remain in a generally extended or partially extended position upon completion of backwashing.

As will be appreciated by those of skill in the art, the effective surface area of the cloth filter media is a key parameter in the sizing, performance and capacity of the cloth filter media filtration devices. Therefore, there is a need to increase the effective surface area of the cloth filter media without the need to use larger equipment, more media, the use of more filtration devices or extensive modification of such units.

While the above referenced and other known backwash shoes provided varying levels of effectiveness in cleaning, there is a need to increase the efficiency of the overall backwash operation in both new and existing filtration facilities. As importantly, there is a need to improve the backwash operation such that the surface area of the cloth filter media is increased to more efficiently and effectively resume the filtration operation after backwashing.

SUMMARY OF THE INVENTION

The present inventions preserve the advantages of known backwash shoes and backwash assemblies and also provide new features and advantages, some of which are discussed herein and others that will become apparent to those of skill in the art.

Accordingly, it is an object of the present invention to provide a backwash shoe that is capable of contouring the surface of the cloth filter media after backwashing.

It is another object of the present invention to provide a backwash shoe that increases the effective filtration surface area of the cloth filter media by contouring the surface of the cloth filter media during the backwashing operation by applying selective pressure on the pile threads of the cloth filter media.

It is an additional object of the present invention to provide a backwash shoe having a trailing edge with a crenelated surface that comes in contact with the cloth filter media to contour the surface of the cloth filter media.

It is a further object of the present invention to provide a backwash shoe that contours the pile threads of the cloth filter media using selective pressure on the pile threads of the cloth filter media to create a three dimensional surface to yield a higher effective filtration surface area of the cloth filter media.

It is still another object of the present invention to provide an improved backwash shoe that allows existing filtration devices and facilities to increase the hydraulic and/or solids loading capacity without substantial modification of the filtration devices.

It is still a further object of the present invention to provide a backwash shoe that reduces the cost of new and/or existing filtration facilities by reducing the size or number of filtration units required.

In accordance with the objects of the present invention, an apparatus for cleaning cloth filter media by backwashing and increasing the effective filtering surface area of the cloth filter media is provided. The cloth filter media has a support fabric and a pile made of pile threads. The apparatus includes: at least one backwash shoe in fluid communication with a suction source; at least one suction slot on said at least one backwash shoe; a leading surface on said at least one backwash shoe, the leading surface being in contact with the pile threads and compressing the pile threads toward the support fabric prior to entering the suction slot, wherein the threads are released into the suction slot; and, a trailing surface on said at least one backwash shoe, the trailing surface having a crenelated surface such that some of the pile threads are flattened toward the support fabric after suction and some of the pile threads remain in an extended or semi-extended position away from the support surface of the cloth filter media after being subject to suction. The present invention may also provide that the backwash shoe has a front edge and a rear edge and the trailing surface has a series of merlons and crenels extending from the suction slot to the rear edge of the backwash shoe. Each merlon has a top wall, each crenel has a bottom wall and the width of the top wall is greater than the width of the bottom wall. The present invention may further provide a backwash shoe wherein the leading and trailing surfaces have a series of merlons and crenels.

The present invention also provides for a method of increasing the effective filtration surface area of cloth filter media in a cloth filter media filtration device by backwashing using a backwash assembly having a backwash shoe. The preferred steps of the method include: (a) placing the at least one backwash shoe in fluid communication with cloth filter media having pile threads and a support surface, the backwash shoe having a leading surface, a trailing surface and a suction slot therebetween; (b) creating relative motion between the backwash shoe and the cloth filter media and applying suction to the suction slot; (c) compressing the pile threads of the cloth filter media in a generally flattened position toward the support surface of the cloth filter media using the leading surface of the backwash shoe; (d) releasing the pile threads into the suction slot by application of suction wherein the pile threads are at least partially straightened; (e) compressing at least a portion of the pile threads toward the support surface of the cloth filter media using the trailing surface of the backwash shoe, wherein the trailing surface of the backwash shoe is a crenelated surface; and, (f) leaving at least a portion of the pile threads in a partially straightened position using the trailing surface of the backwash shoe. The method may also provide that the pile fibers that contact a merlon of the trailing surface of the backwash shoe are compressed toward the support surface of the cloth filter media and the pile fibers that contact a crenel of the trailing, crenelated surface of the backwash shoe remain in an extended or partially extended position.

Also in accordance with the present invention, a backwash shoe for cleaning by backwashing cloth filter media having a support surface and pile threads is provided. The backwash shoe includes: a generally planar leading surface; a crenelated trailing surface, the trailing surface formed form a series of merlons and crenels; a suction slot between the leading surface and the trailing surface; and, wherein the merlons and crenels extend from the suction slot to a rear edge of the backwash shoe in a channel like configuration. In addition, the height (i.e., top wall) of the merlons may be on the same plane as the leading surface. And, the top wall of the merlon may be larger than the bottom wall of the crenel.

The present invention further provides for a method of contouring cloth filter media of a cloth media filtration device during backwashing using a backwash assembly and suction, the cloth filter media having a pile made of pile threads. A preferred method of contouring includes the steps of: (a) creating relative motion between a backwash shoe of the backwash assembly and the cloth filter media; (b) compacting the pile threads of the cloth filter media with a leading surface of the backwash shoe; (c) subjecting the pile threads to suction using a suction slot on the backwash shoe for cleaning; and, (d) contouring the pile threads of the cloth filter media using a trailing surface of the backwash shoe, the trailing surface compressing selected portions of the pile threads whereby the surface area of the cloth filter media is increased. Also provided may be the method wherein the trailing surface of the backwash shoe includes a series of merlons and crenels which contour the pile threads into a matching surface. Alternatively, the trailing surface of the backwash shoe may include a wave like surface that contours the pile threads of the cloth filter media into a matching surface.

INVENTOR'S DEFINITION OF THE TERMS

The following terms which may be used in the various claims and/or specification of this patent are intended to have their broadest meaning consistent with the requirements of law:

"Cloth filter media" as used herein shall mean natural or synthetic cloth membranes, some of which are described above, that generally and broadly include a support fabric and a pile made of pile threads.

"Relative motion" as used herein shall mean the motion between the cloth filter media and the backwash shoe, such as when the backwash assembly moves relative to the cloth filter media or the cloth filter media moves relative to the backwash assembly during the backwashing operation.

"Leading surface" as used herein shall mean that portion of the front face of the backwash shoe that first contacts the cloth filter media as a result of the relative motion between the backwash assembly and the cloth filter media during the backwashing operation.

"Trailing surface" as used herein shall mean that portion of the front face of the backwash shoe that last contacts the cloth filter media as a result of the relative motion between the backwash assembly and the cloth filter media during the backwashing operation.

"Merlon" as used herein shall mean the solid, raised portion adjacent to the notches, recesses or crenels.

"Crenel" as used herein shall mean the notches, recessed or open spaces adjacent to the merlons.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
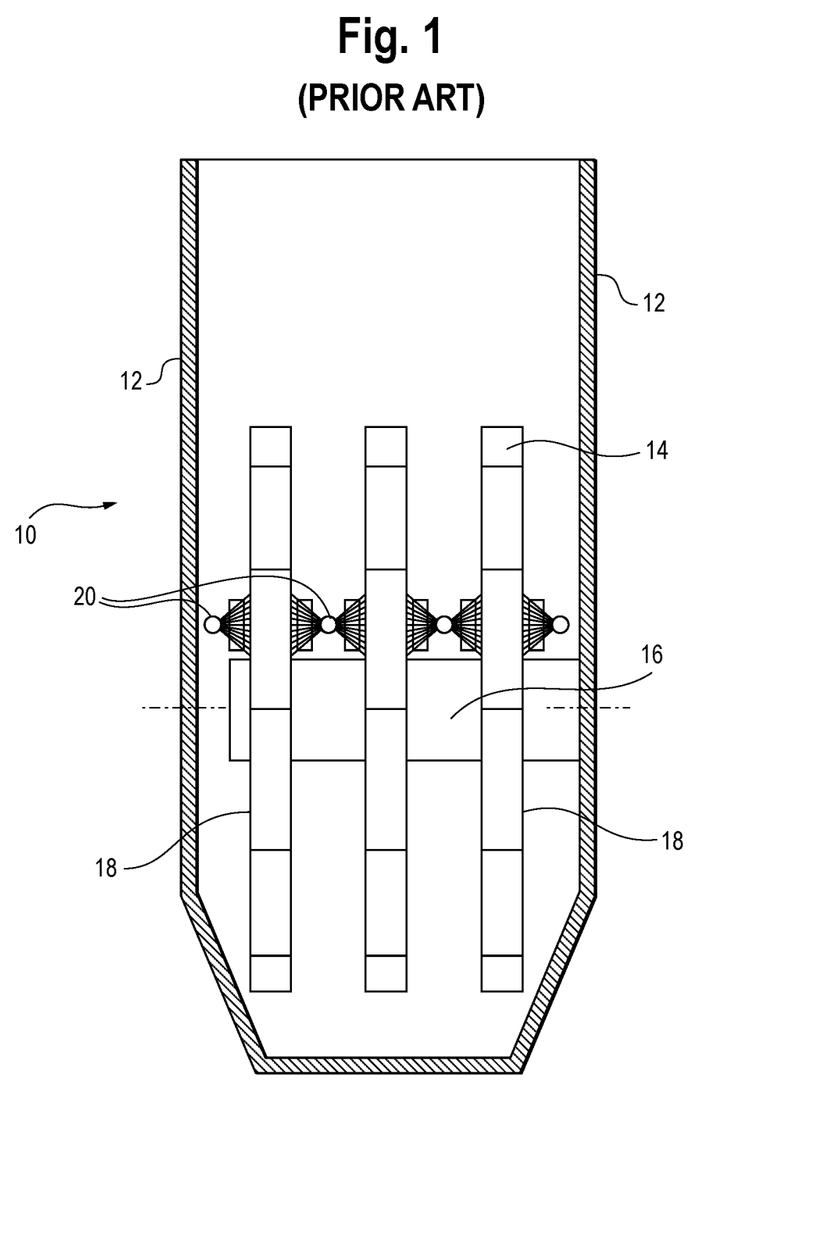
FIG. 1 is a cross-sectional schematic view of a prior art cloth filter media filtration device as an exemplary embodiment into which the present inventions may be incorporated.

FIG. 1 depicts a prior art filtration apparatus 10 into which the present inventions may be incorporated. Filtration apparatus 10 is particularly useful for water and wastewater treatment. The filtration apparatus includes a tank or basin 12 and at least one or preferably a series of hollow filtration frames 14 disposed within the tank 12. Each filter frame 14 is covered by cloth filter media 18 having a pile made of pile threads 17 and a support surface 19 (not shown in FIG. 1). The filter frames 14 are attached to and in fluid communication with a center pipe 16 that in this embodiment serves as an effluent channel for the filtered effluent. In this embodiment of the apparatus, the influent of the water to be filtered is deposited into tank 12 and passes through cloth filter media 18 for filtration. The filtered effluent flows through hollow filter frames 14 into center pipe 16 for discharge. It will be understood by those of skill in the art that filtration may occur in reverse to that described, i.e., what it typically referred to as inside-out filtration.

Filtration apparatus 10 includes one or more backwash assemblies 20 which are operable, in this example, to draw the filtered effluent back through the cloth filter media 18 in the opposite direction of flow in the normal filtration operation. During backwashing, one or more of the backwash assemblies 20 are positioned in communication with the upstream or influent side of the cloth filter media 18 and are drawn into contact with the cloth filter media 18 by spring actuators (not shown) or other well known means. Applying suction to the backwash assembly then draws the filtered effluent through cloth filter media 18 and into backwash assembly 20 and is typically sent to the head of the treatment plant for retreatment.

As previously discussed, some of the known backwash assemblies 20 compress the pile threads 17 of the cloth filter media 18 against the cloth filter media support surface 19 after the backwashing operation. Other known backwash assemblies leave the piles 17 extended or semi-extended from the support surface 19 since they are designed not to recompress the pile threads 17. None of the known backwash assemblies 20 are capable (like the present inventions) of contouring the piles 17 of the cloth filter media 18 to increase the overall effective surface area of the cloth filter media 18. The preferred backwash shoes 30 of the present inventions are able to, among other things, increase the effective surface area of the cloth filter media 18 and increase the efficiency of filtration in the filtration apparatus 10 by contouring the cloth filter media 18 after or as part of backwashing.

Figure 2A:
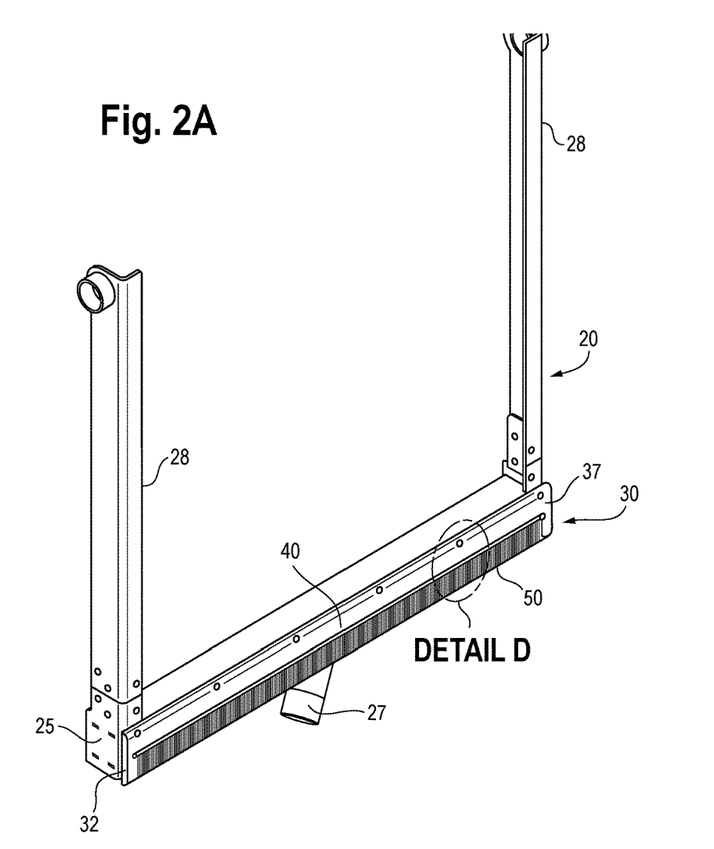
FIG. 2A is a perspective view of an exemplary backwash assembly having a preferred embodiment of a backwash shoe of the present invention.
Figure 2B:
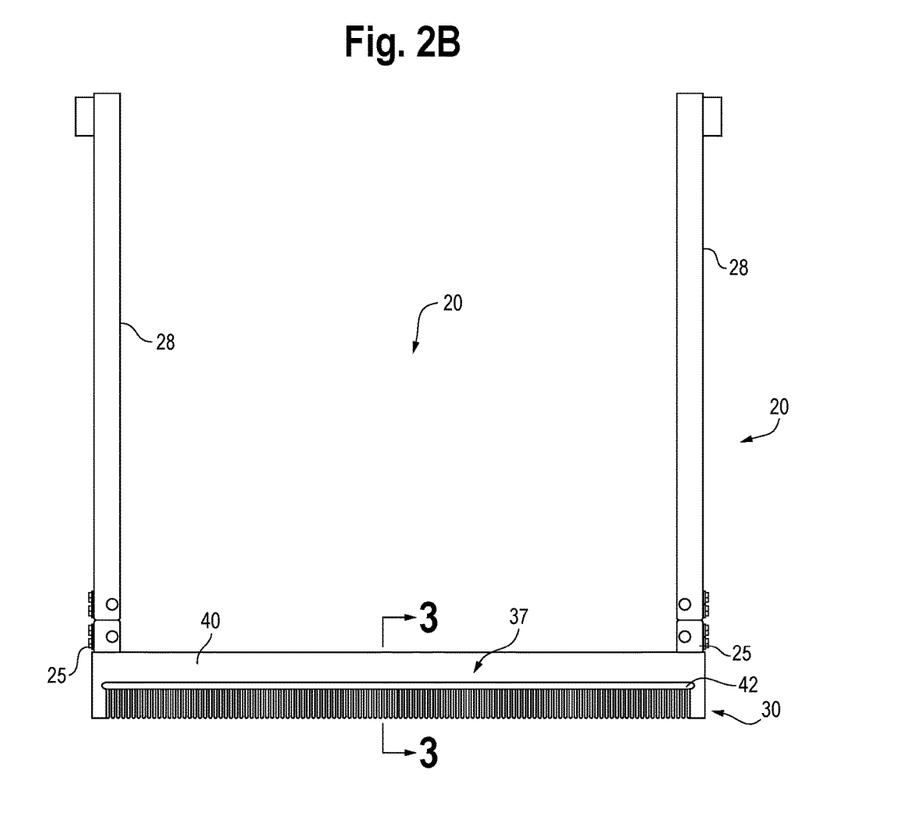
FIG. 2B is a front view of the backwash assembly of FIG. 2A also showing the preferred embodiment of the backwash shoe of the present invention.
Figure 3:
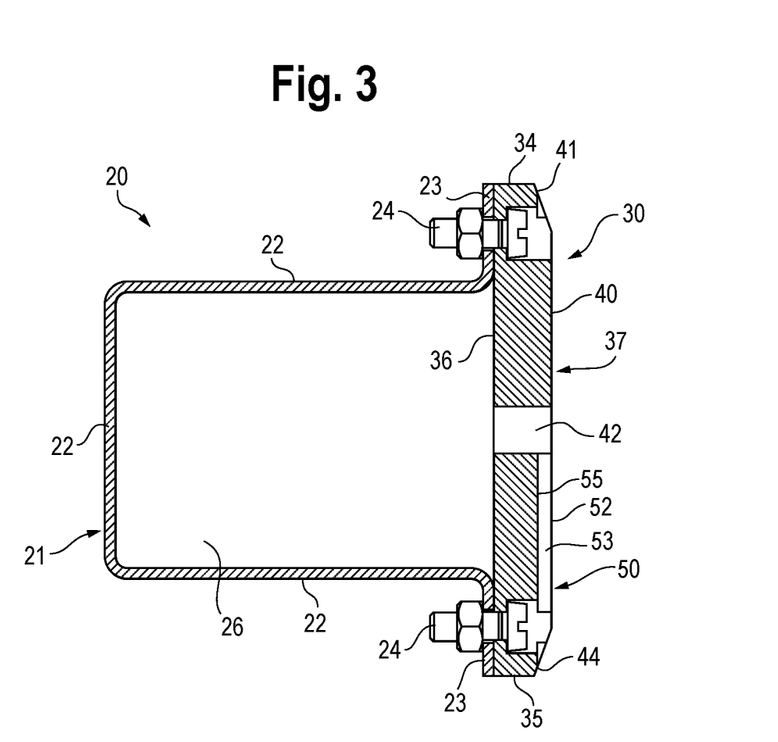
FIG. 3 is a cross-sectional view of the backwash assembly and preferred backwash shoe of the present invention taken along line 3-3 of FIG. 2B.
Figure 4:
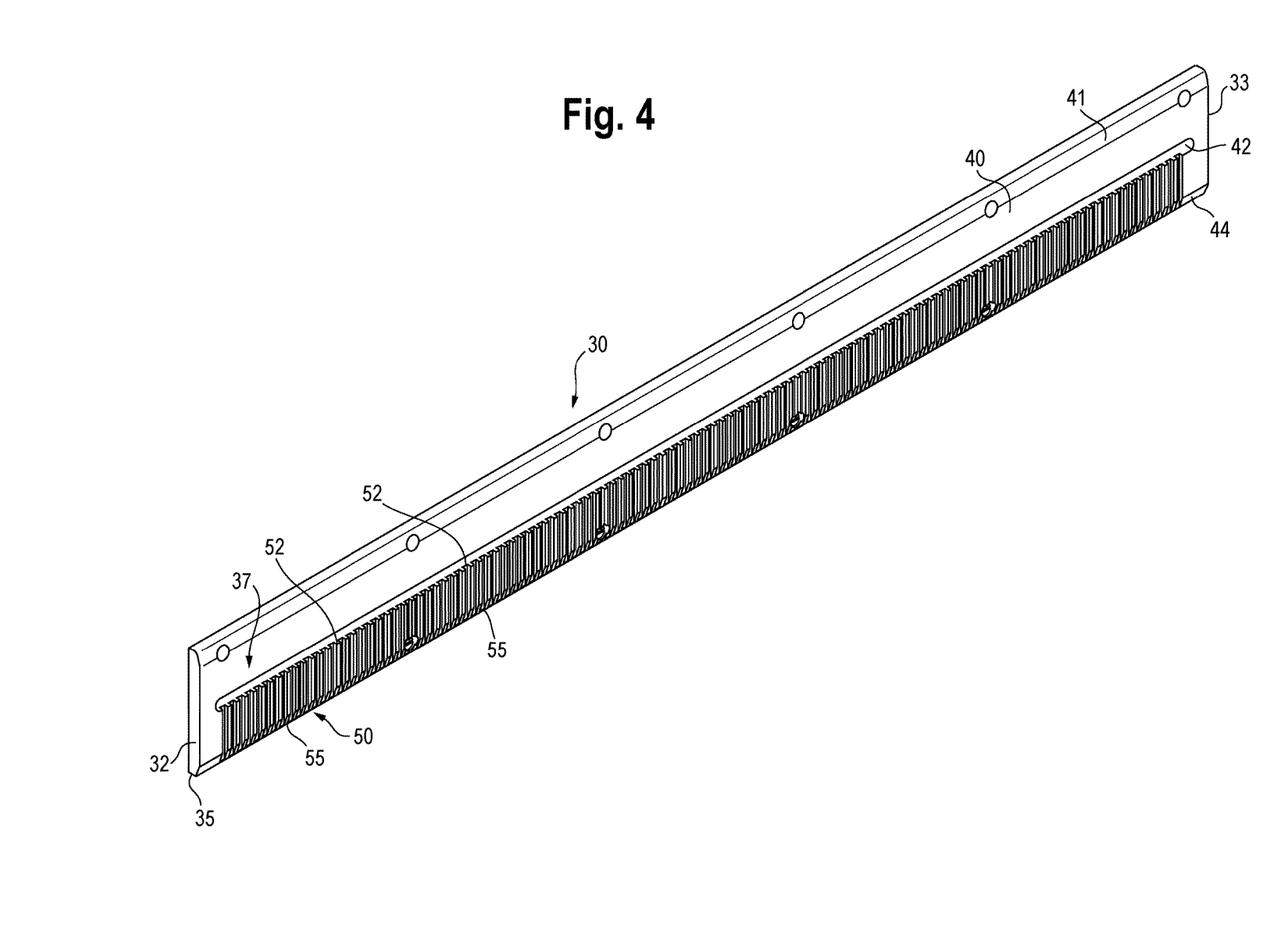
FIG. 4 is a perspective view of a preferred backwash shoe of the present invention.
Figure 5:
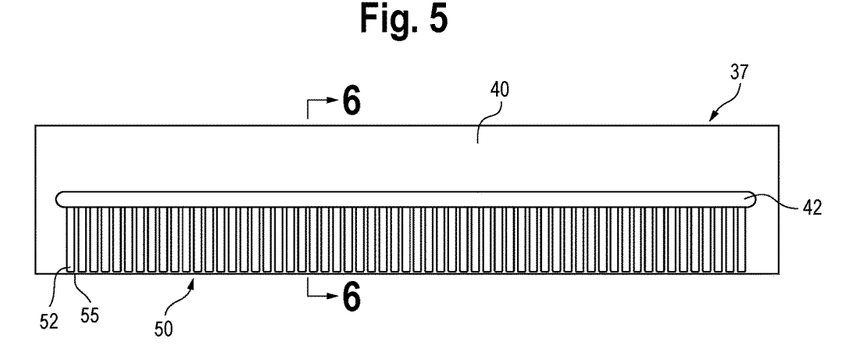
FIG. 5 is a top plan view of a preferred backwash shoe of the present invention.
Figure 6:
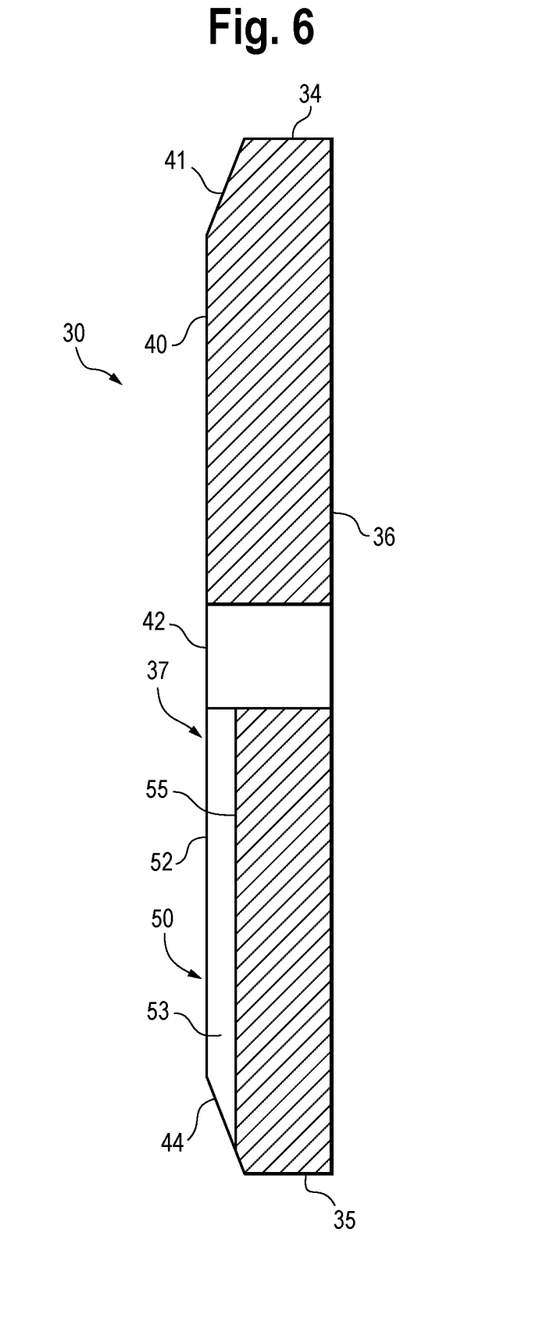
FIG. 6 is a cross-sectional schematic view of the preferred backwash shoe of the present invention taken along line 6-6 of FIG. 5.

A typical backwash assembly 20 that may be used with the present inventions is shown in FIGS. 2A, 2B and 3. A preferred embodiment of backwash shoe 30 is shown as part of the backwash assembly 20. Backwash assembly 20 includes a suction chamber 21, which is a generally rectangular, substantially hollow structure having three sides 22. The front end of suction chamber 21 may terminate in two flanges 23. Flanges 23 may be used to secure preferred backwash shoe 30 to suction chamber 21 using fasteners 24 or other well known means and create the fourth side of the substantially hollow chamber. Backwash shoe 30 is preferably sealed to suction chamber 21.

Each end of suction chamber 21 may be sealed with an end cap 25. In this manner, a substantially hollow plenum 26 is formed. A suction pipe 27 is in fluid communication with plenum 26. Suction pipe 27 is in turn connected to a suction pump (not shown) that is used to draw suction through a suction slot 42 of the backwash shoe 30 to conduct the backwashing operation. A pair of support arms 28 are also provided that are attached to end caps 25 to suspend the backwash assembly 20 into a typical tank or basin 10, so that backwash assembly 20 is adjacent to the cloth filter media 18, as will be understood by those of skill in the art. It will also be understood by those of skill in the art that suction chamber 21 may take a variety of configurations, such as a tubular shape and the like.

Figure 2C:
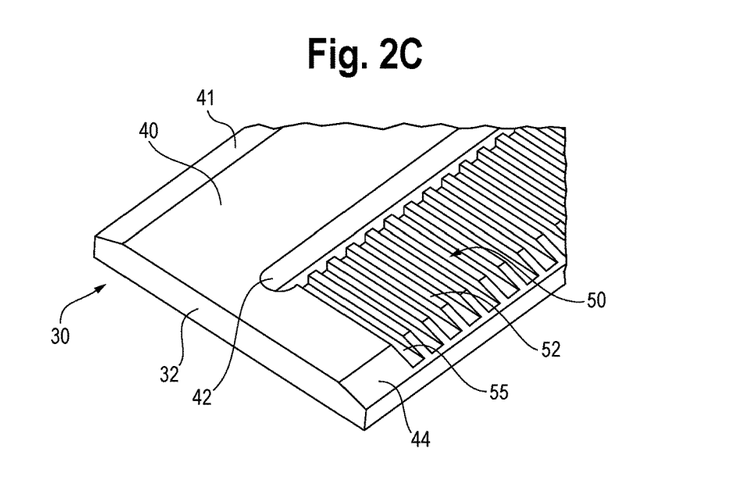
FIG. 2C is an enlarged perspective view of one end of the preferred embodiment of the backwash shoe of the present invention.
Figure 2D:
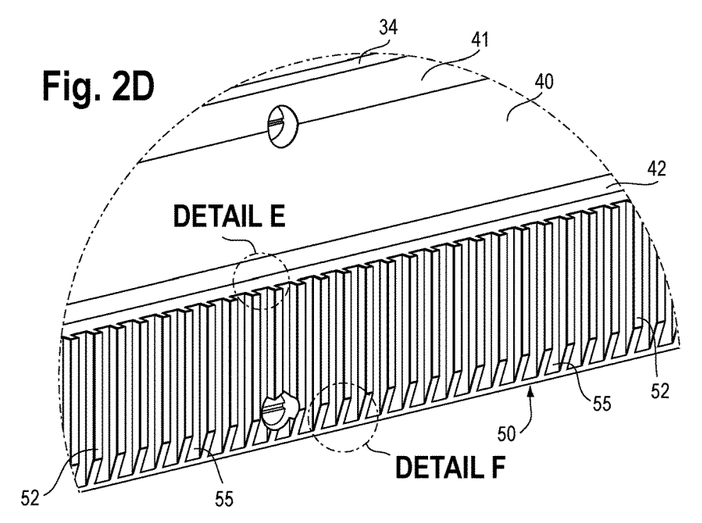
FIG. 2D is an enlarged perspective view of a portion of a preferred backwash shoe of the present invention taken from detail D of FIG. 2A.
Figure 2E:
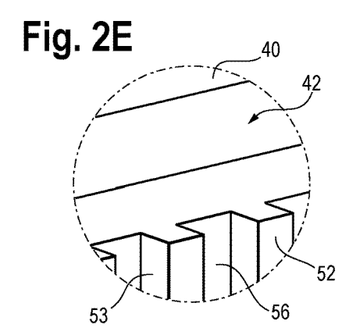
FIG. 2E is an enlarged perspective view of a portion of the preferred backwash shoe of the present invention taken from detail E of FIG. 2D.
Figure 2F:
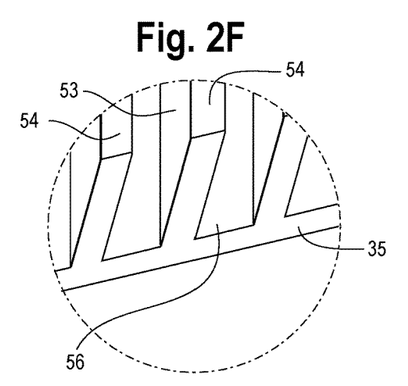
FIG. 2F is an enlarged perspective view of the merlons and crenels of a preferred embodiment of the present invention taken from detail F of FIG. 2D.

A preferred embodiment of backwash shoe 30 that is capable of accomplishing some or all of the features and advantages of the present inventions may be seen in greater detail by reference to FIGS. 3-9. In particular, the unique face 37 of the backwash shoe 30 of the present inventions may best be seen in FIGS. 3-9. The overall structure of backwash shoe 30 includes two ends 32 and 33 and a length extending therebetween (see e.g., FIGS. 2C and 4). A front edge 34, a rear edge 35 and a back surface 36 are also provided. The front face 37 includes a leading surface or first area of contact plate 40. Leading surface 40 may also include a tapered portion 41. In the preferred embodiment, the leading surface 40 is flat and generally planar. Adjacent to the leading surface plate 40 is a suction slot 42. Suction slot 42 extends between front face 37 and back surface 36 of backwash shoe 30 such that it is in fluid communication with suction chamber 21 as will be understood by those of skill in the art. Suction slot 42 extends for a substantial portion of the length of the backwash shoe 30. Front face 37 of backwash shoe 30 also includes a trailing surface or final area of contact plate 50, which is immediately adjacent to suction slot 42. Trailing surface 50 may also include a tapered portion 44.

The unique structural features of backwash shoe 30, and particularly the preferred crenelated trailing surface 50 of front face 37, may be seen by reference to FIGS. 3-8. Specifically, extending between rear edge 35 and suction slot 42 on trailing surface 50 are a series of parallel merlons 52 and crenels 55. Each merlon 52 has a side wall 53 and a top wall 54. Each crenel 55 has a bottom wall 56. In the preferred embodiment, top wall 54 of merlon 52 is on the same plane, i.e., has the same height (H; see FIG. 9), as leading surface 40. The bottom wall 56 of each crenel 55 is lower than top wall 54 by the height (H) of side wall 53. The front portion of each merlon 52 and each crenel 55 is adjacent to suction slot 42, with each crenel 55 forming a channel and being in fluid communication with the suction slot 42. The rear portions of each merlon 52 and crenel 55 terminate at rear edge 35 of backwash shoe 30.

Figure 7A:
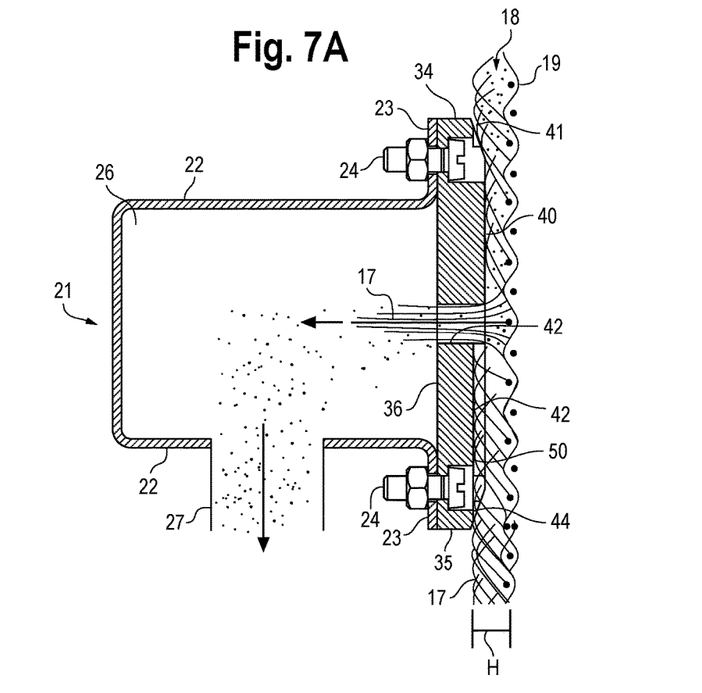
FIG. 7A is a cross-sectional view of a backwash assembly and a preferred embodiment of the backwash shoe of the present invention shown during backwashing of the cloth filter media and showing the extended pile threads at a crenel of the backwash shoe after backwashing.
Figure 7B:
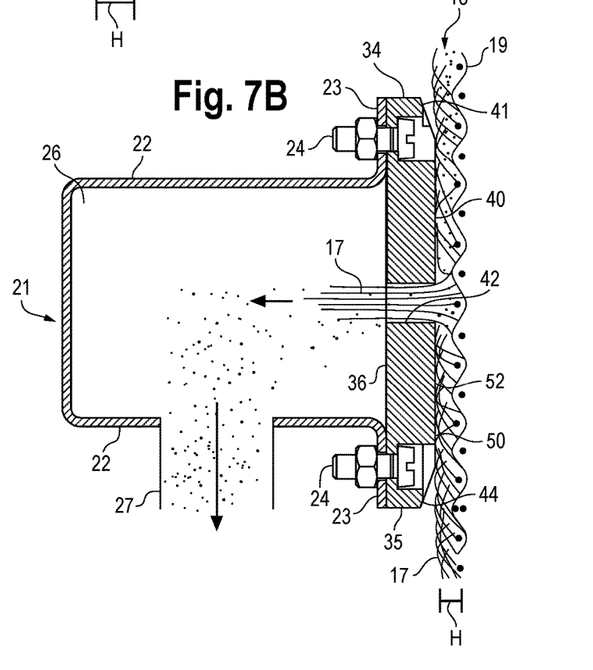
FIG. 7B is a cross-sectional view of a backwash assembly and a preferred embodiment of the backwash shoe of the present invention shown during backwashing of the cloth filter media and showing the compressed pile threads at a merlon of the backwash shoe after backwashing.
Figure 8:
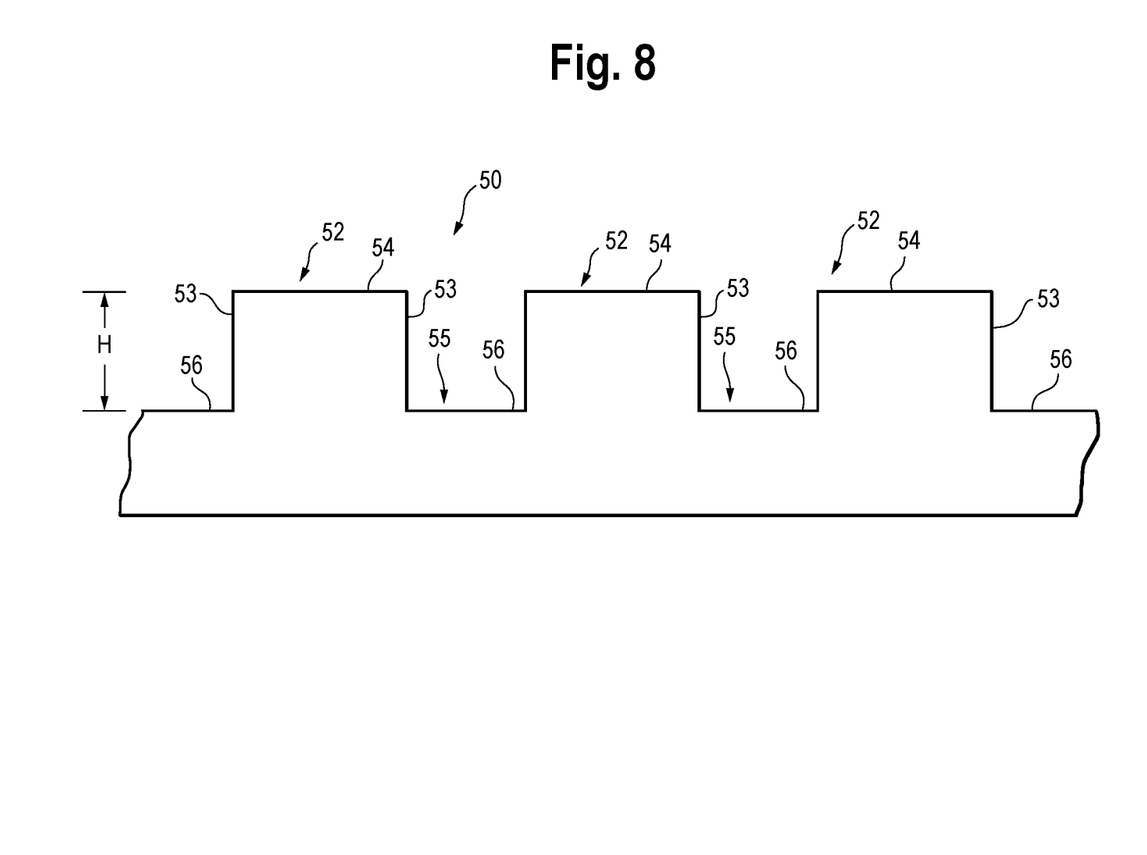
FIG. 8 is a profile view of a preferred crenelated embodiment of the trailing surface of the present invention, as well as a schematic profile of an alternative embodiment of a crenelated leading surface of a backwash shoe of the present invention.

The operation of backwash shoe 30, and particularly trailing surface 50 of front face 37 may best be seen by reference to FIGS. 7A and 7B, and FIGS. 9 and 9A. As shown in FIGS. 7A and 7B, cloth filter media 18 is moving in relation to backwash shoe 30 as shown by the arrows. As shown, during a backwash operation, because of the relative motion between the cloth 18 and the backwash shoe 30, the piles 17 of the cloth filter media 18 come into contact with leading surface 40 of backwash shoe 30. Leading surface 40 acts mechanically on the pile threads 17 to substantially flatten all or a portion of them against the support surface 19. As soon as the pile threads 17 reach suction slot 42, they are straightened abruptly by the suction flow created in the hollow plenum 26 of suction chamber 21, as will be understood by those of skill in the art.

As the cloth filter media 18 continues to move after being released from suction slot 42, the pile fibers 17 then come into contact with the trailing surface 50. As shown in FIG. 7A, the pile threads 17 that are in contact with the crenel 55 are only slightly compressed against support surface 19. This is because bottom wall 56 is lower than top wall 54 of crenel 52 (see FIG. 8). In addition, because of this, the suction applied through suction slot 42 may still partially act on the piles 17 in the channel created by the crenel 55. In this manner, and upon exiting the trailing surface 50, the piles 17 in the channel created by crenels 55 remain a distance (H) from the support fabric, i.e., which is approximately the height of side wall 53.

FIG. 7B shows the same backwash operation as shown in FIG. 7A. However, FIG. 7B shows the cloth filter media 18 coming into contact (if desired) with merlons 52. Specifically, leading surface 40 acts to compress or partially compress the pile fibers 17 against support surface 19. Upon reaching suction slot 42, the piles 17 are released into suction slot 42 and the particles removed. After leaving suction slot 42, the pile threads 17 are again compressed or partially compressed against support surface 19. This is because, in the preferred embodiment, the top wall 54 of merlon 52 is on the same plane, i.e., is approximately the same height, as leading surface 40. The degree of contact by top wall 54 of merlon 52 is a design consideration.

Figure 9:
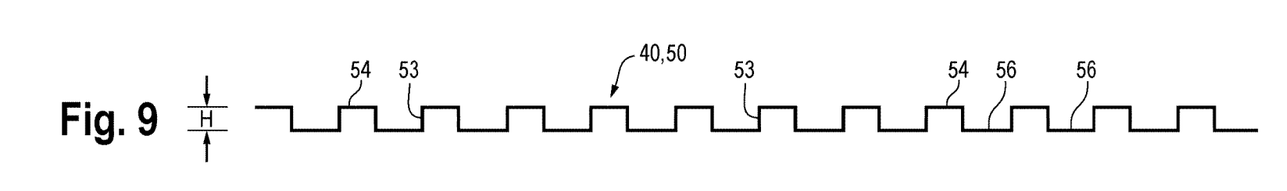
FIG. 9 is a side schematic profile of a preferred crenelated trailing surface of the present invention.
Figure 9A:
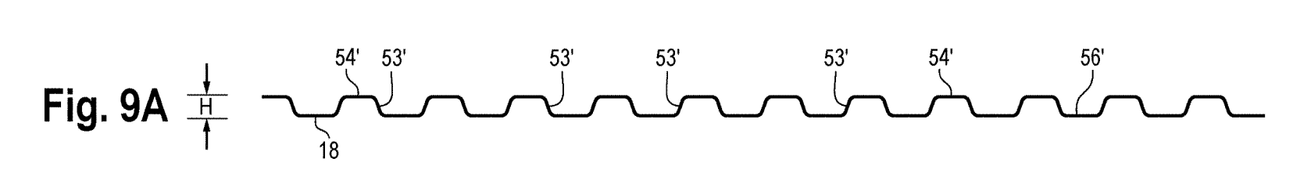
FIG. 9A is a side profile view of the contour of the surface of the cloth filter media after contouring by the preferred embodiment of the trailing surface of the backwash shoe of the present invention.
Figure 9B:
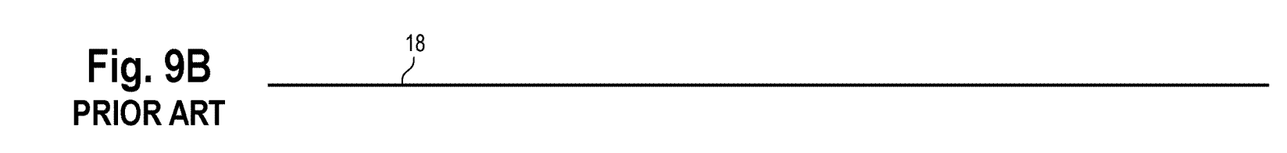
FIG. 9B is a side profile view of the surface of the cloth filter media after backwashing by a typical prior art backwash shoe.

The profile of the cloth filter media 18 after leaving the trailing edge 50 is shown in cross-section in FIG. 9A. As can be seen, the backwashed cloth filter media 18 takes on approximately the same profile as the trailing surface 50, as shown by comparing FIG. 9 with FIG. 9A. Cloth filter media 18 has side surfaces $53^1$, top surfaces $54^1$ and bottom surfaces $56^1$. As a result, the increased surface area of cloth filter media 18 is approximately the sum of the height (H) of the side surfaces $53^1$, all created by the crenelated surface of trailing surface 50. FIG. 9B shows the cloth 18 profile after backwashing by known backwash shoes 30. As shown, the profile of cloth filter media 18 is relatively flat.

Figure 9C:
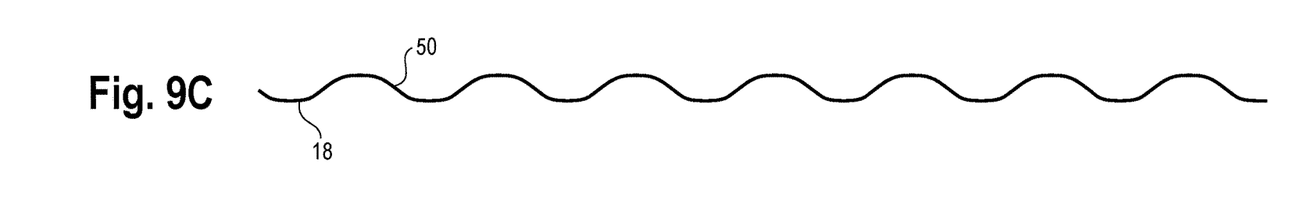
FIG. 9C is a side profile view of the surface of the cloth filter media after contouring by an alternative embodiment of the trailing edge of the backwash shoe of the present invention, which also represents an alternative embodiment of the trailing surface of the present invention.

Thus, the backwash shoe 30 of the present invention increases the effective surface area of cloth filter media 18 that is able to filter particles without the need for expensive modifications to existing cloth media filtration systems or to increase the capacity of a new (or old) installation. It will be understood by those of skill in the art that the merlons 52 and crenels 55 do not have to be square. For example, the profile of trailing surface 50 may be of a wave pattern (see FIG. 9C), contouring the cloth filter media 18 into the corresponding shape. Other profiles may also be used as will be understood by those of skill in the art. In addition, the top wall 54 of the merlons 52 can be the same size as the bottom wall 56 of crenel 55. Alternatively, the size of top wall 54 may be less than or greater than the size of bottom wall 56. In the preferred embodiment, top wall 54 is larger than bottom wall 56.

In addition, it will also be understood by those of skill in the art that the leading surface 40 does not have to compress the pile threads 17 against the support surface 19 prior to the suction slot 42 to practice the present invention. Moreover, in an alternative embodiment of the present invention, the leading surface 40 of backwash shoe 30 may also have a crenelated surface. As shown in FIG. 9, a typical crenelated surface may take a form similar to the leading surface 40, an example of which is shown as 40/50 in FIG. 9.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. An apparatus for cleaning cloth filter media by backwashing and increasing the effective filtering surface area of the cloth filter media, the cloth filter media having a support fabric and a pile made of pile threads, the apparatus comprising:
    at least one backwash shoe in fluid communication with a suction source;
    at least one suction slot on said at least one backwash shoe;
    a leading surface on said at least one backwash shoe, the leading surface being in contact with the pile threads and compressing the pile threads at least partly toward the support fabric prior to entering the suction slot, wherein the threads are released into the suction slot; and,
    a trailing surface on said at least one backwash shoe, the trailing surface having a crenelated surface such that some of the pile threads are flattened toward the support fabric after suction and some of the pile threads remain in an extended or semi-extended position away from the support surface of the cloth filter media after being subject to suction.

2. The apparatus of claim 1 wherein the backwash shoe has a front edge and a rear edge and wherein the at least trailing surface has a series of merlons and crenels extending from the suction slot to the rear edge of the backwash shoe.

3. The apparatus of claim 2 wherein the backwash shoe has a front edge and a rear edge and wherein the trailing surface and the leading surface have a series of merlons and crenels.

4. The apparatus of claim 3 wherein each merlon has a top wall, each crenel has a bottom wall and wherein the width of the top wall is greater than the width of the bottom wall.

5. The apparatus of claim 2 wherein each merlon has a top wall, each crenel has a bottom wall and wherein the width of the top wall is greater than the width of the bottom wall.

6. A method of increasing the effective filtration surface area of cloth filter media in a cloth filter media filtration device by backwashing using a backwash assembly having a backwash shoe, the method comprising the steps of:
    a. placing the at least one backwash shoe in fluid communication with cloth filter media having pile threads and a support surface, the backwash shoe having a leading surface, a trailing surface and a suction slot therebetween;
    b. creating relative motion between the backwash shoe and the cloth filter media and applying suction to the suction slot;
    c. compressing the pile threads of the cloth filter media in a generally flattened position toward the support surface of the cloth filter media using the leading surface of the backwash shoe;
    d. releasing the pile threads into the suction slot by application of suction wherein the pile threads are at least partially straightened into the suction slot;
    e. compressing at least a portion of the pile threads toward the support surface of the cloth filter media using the trailing surface of the backwash shoe,
       wherein the trailing surface of the backwash shoe has a crenelated surface; and,
    f. leaving at least a portion of the pile threads in a partially straightened position using the trailing surface of the backwash shoe.

7. The method of claim 6 wherein the pile fibers that contact a merlon of the trailing surface of the backwash shoe are compressed toward the support surface of the cloth filter media and the pile fibers that contact a crenel of the trailing surface of the backwash shoe remain in an extended or partially extended position.

8. A backwash shoe for cleaning by backwashing cloth filter media using suction, the cloth filter media having a support surface and pile threads, the backwash shoe comprising:
    a crenelated trailing surface, the trailing surface formed form a series of merlons and crenels;
    a leading surface;
    a suction slot between the leading surface and the trailing surface;
    a suction chamber in fluid communication with the suction slot;
    a suction pump in fluid communication with the suction chamber to create suction along the suction slot during backwashing; and,
    wherein the merlons and crenels on the trailing surface of the backwash shoe extend from the suction slot to a rear edge of the backwash shoe.

9. The backwash shoe of claim 8 wherein the top wall of the merlon is on the same plane as the leading surface.

10. The backwash shoe of claim 9 wherein the top wall of the merlon is larger than the bottom wall of the crenel.

11. A method of contouring cloth filter media of a cloth media filtration apparatus during backwashing using a backwash assembly and suction, the cloth filter media having a pile made of pile threads, the method of contouring at least a portion of the pile threads during backwashing comprising the steps of:
    a. creating relative motion between a backwash shoe of the backwash assembly and the cloth filter media;
    b. compacting the pile threads of the cloth filter media with a leading surface of the backwash shoe;
    c. subjecting the pile threads to suction using a suction slot on the backwash shoe for cleaning; and, d. contouring the pile threads of the cloth filter media using a trailing surface of the backwash shoe, the trailing surface having a wave pattern that shapes at least a portions of the pile threads in a substantially matching wave pattern whereby the surface area of the cloth filter media is increased.

* * * * *